US012724806B2

(12) United States Patent
Beauchamp et al.

(10) Patent No.: US 12,724,806 B2
(45) Date of Patent: Sep. 1, 2026

(54) SYSTEMS AND METHODS FOR PERFORMING VECTOR SEARCH

(71) Applicant: Shopify Inc., Ottawa (CA)

(72) Inventors: Daniel Beauchamp, Toronto (CA); Andreas Winschu, Hamburg (DE)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 18/472,592

(22) Filed: Sep. 22, 2023

(65) Prior Publication Data

US 2024/0289365 A1 Aug. 29, 2024

Related U.S. Application Data

(60) Provisional application No. 63/501,417, filed on May 11, 2023, provisional application No. 63/487,496, filed on Feb. 28, 2023.

(51) Int. Cl.
*G06F 16/334* (2025.01)
*G06F 16/3329* (2025.01)
*G06F 16/335* (2019.01)

(52) U.S. Cl.
CPC ...... *G06F 16/3347* (2019.01); *G06F 16/3329* (2019.01); *G06F 16/335* (2019.01)

(58) Field of Classification Search
None
See application file for complete search history.

(56) References Cited

U.S. PATENT DOCUMENTS

2016/0078101 A1 3/2016 Somaiya et al.
2018/0089316 A1* 3/2018 Ganot .................. G06F 16/289
2022/0164380 A1 5/2022 Lin et al.
2022/0277008 A1* 9/2022 Bordawekar .......... G06N 20/00
2023/0083512 A1* 3/2023 Newman ................ G06N 3/045 704/9
2023/0244678 A1* 8/2023 Hill ..................... G06F 16/3329 707/748
2023/0252233 A1* 8/2023 Gutierrez ................ G06F 40/20 704/9
2023/0259705 A1* 8/2023 Tunstall-Pedoe .... G06N 3/0499 704/9
2023/0368268 A1* 11/2023 Wang ................. G06Q 30/0631
2023/0368284 A1* 11/2023 Sheikh .................. H04L 9/0618
2024/0202539 A1* 6/2024 Poirier ................ G06F 16/3347
2024/0221738 A1* 7/2024 Garg ....................... G10L 25/78

(Continued)

FOREIGN PATENT DOCUMENTS

WO 2021205080 A1 10/2021

OTHER PUBLICATIONS

International Searching Authority; PCT Written Opinion and International Search Report relating to application No. PCT/CA2024/050085 dated May 7, 2024.

*Primary Examiner* — Christopher J Raab
(74) *Attorney, Agent, or Firm* — Rowand LLP

(57) ABSTRACT

A computer-implemented is disclosed. The method includes: receiving a search query input; generating input enhancement data based on the search query input, the generating comprising processing the search query input using a large language model (LLM); causing to transform at least one of the search query input or the input enhancement data into a first vector embedding; and performing a search of an embedding space based on the first vector embedding.

19 Claims, 7 Drawing Sheets

(56) References Cited

U.S. PATENT DOCUMENTS

| | | | | |
|---|---|---|---|---|
| 2024/0241897 | A1* | 7/2024 | Wang | G06F 16/338 |
| 2024/0242428 | A1* | 7/2024 | Ackerman | G06F 40/166 |
| 2024/0265281 | A1* | 8/2024 | Hart | G06F 40/58 |
| 2024/0289360 | A1* | 8/2024 | Chepkwony | G06F 16/3328 |

* cited by examiner

SYSTEMS AND METHODS FOR PERFORMING VECTOR SEARCH

CROSS-REFERENCE TO RELATED APPLICATIONS

The present application claims priority to U.S. Provisional Patent Application No. 63/487,496 filed on Feb. 28, 2023, and U.S. Provisional Patent Application No. 63/501,417 filed on May 11, 2023, the contents of which are herein incorporated by reference in their entirety.

TECHNICAL FIELD

The present disclosure relates to search engine technology and, more particularly, to search techniques that leverage use of generative artificial intelligence (AI) systems.

BACKGROUND

Traditional keyword search relies on text-matching to find relevant content. In contrast, vector search allows for searching based on meaning. Vector search is a search technique that enables capturing user intent, search context, and the semantic relationships between objects in a relevant search space. Vector search is useful for searching unstructured data, such as text, video, images, audio, etc., to identify content that is similar to a given query object.

BRIEF DESCRIPTION OF THE DRAWINGS

Reference will now be made, by way of example only, to the accompanying drawings which show example embodiments of the present application, and in which.

Like reference numerals are used in the drawings to denote like elements and features.

DETAILED DESCRIPTION OF IMPLEMENTATIONS

Figure 1:
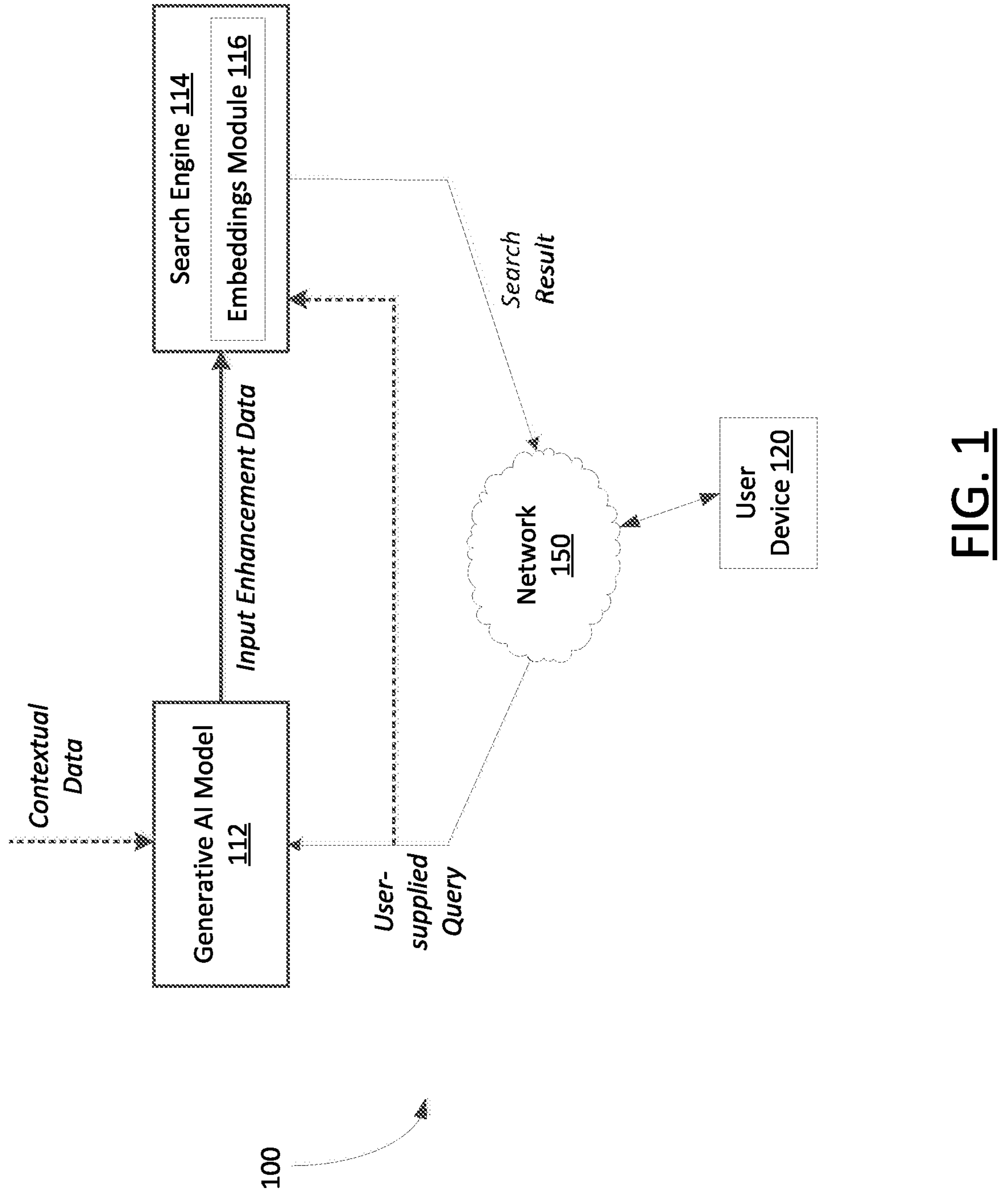
FIG. 1 illustrates, in block diagram form, an example system for implementing a search engine that integrates use of a generative AI model.

In an aspect, the present application discloses a computer-implemented method. The method may include: receiving a search query input; generating input enhancement data based on the search query input, the generating comprising processing the search query input using a large language model (LLM); causing to transform at least one of the search query input or the input enhancement data into a first vector embedding; and performing a search of an embedding space based on the first vector embedding.

In some implementations, the search query input may comprise at least one of text, image, or video.

In some implementations, the input enhancement data may comprise at least one of enhancement text, enhancement image, or enhancement video that is not included in the search query input.

In some implementations, the input enhancement data may comprise enhancement text that includes product description text associated with the search query.

In some implementations, the product description text may be generated by the LLM based on properties relevant to the search query.

In some implementations, at least some of the properties relevant to the search queries may be determined using the LLM.

In some implementations, the method may further include: causing to be presented, via a user device, one or more prompts comprising questions relating to the search query input; and receiving user responses to the one or more prompts, and the generated input enhancement data may be further based on the user responses.

In some implementations, performing the search may further include: performing a search of a second embedding space based on a second vector embedding, the second vector embedding based on at least one of the search query input or the input enhancement data; and combining one or more results of the search of the embedding space with the search of the second embedding space.

In some implementations, the method may further include: obtaining contextual data associated with the search query input, and processing the search query input may include inputting the contextual data to the LLM prior to generating the input enhancement data.

In some implementations, the contextual data may include historical chat log data for a user.

In some implementations, the contextual data may include profile information of a user, the profile information including at least one of product purchase history or browsing history.

In some implementations, causing to transform the at least one of the search query input or the input enhancement data into a first vector embedding may include combining the search query input and the input enhancement data prior to creating the first vector embedding.

In another aspect, the present application discloses a computing system. The computing system includes a processor and a memory coupled to the processor. The memory stores computer-executable instructions that, when executed by the processor, may configure the processor to: receive a search query input; generate input enhancement data based on the search query input, the generating comprising processing the search query input using a large language model (LLM); cause to transform at least one of the search query input or the input enhancement data into a first vector embedding; and perform a search of an embedding space based on the first vector embedding.

In another aspect, the present application discloses a non-transitory, processor-readable medium storing processor-executable instructions that, when executed by a processor, may cause the processor to: receive a search query input; generate input enhancement data based on the search query input, the generating comprising processing the search query input using a large language model (LLM); cause to transform at least one of the search query input or the input enhancement data into a first vector embedding; and perform a search of an embedding space based on the first vector embedding.

Other example implementations of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "generative AI model" (or simply "generative model") may be used to describe a machine learning model. A generative AI model may sometimes be referred to, or may use, a language learning model. A trained generative AI model may respond to an input prompt by generating and producing an output or result. The output/result may be generated by the generative AI model through interpreting the intent and context of the prompt. In some cases, the generative AI model may be implemented with constraints on the acceptable prompts. In some cases, this may include a prompt template. A prompt template may specify that prompts have a certain structure or constrained intents, or that acceptable prompts exclude certain classes of subject matter or intent, such as the production of results or outputs that are violent, pornographic, etc.

Significant advances have been made in recent years in generative AI models. Different implementations may be trained to create digital art, computer code, conversation text responses, or other types of outputs. Examples of generative AI models include Stable Diffusion by Stability AI Ltd., ChatGPT by OpenAI, DALL-E 2 by OpenAI, and GitHub CoPilot by GitHub and OpenAI.

The models are typically trained using a large data set of training data. For instance, in the case of AI for generating images, the training data set may include a database of millions of images tagged with information regarding the contents, style, artist, context, or other data about the image or its manner of creation. The generative AI trained on such a data set is then able to take an input prompt in text form, which may include suggested topics, features, styles or other suggestions, and provide an output image that reflects, at least to some degree, the input prompt.

Techniques for Performing Search

Traditional keyword search of relational databases relies on use of tags, keywords, or labels to find relevant content. Each object in a database is associated with certain keywords, and a search of the database returns objects tagged with keywords that match a search query. Basic keyword searches are limited in that they principally use text-matching techniques for retrieving results. In particular, keyword searches do not capture user intent, search context, or the semantic relationships between objects in a search space.

Vector search provides a more refined way to find content. Vector search can power a similarity search based on meaning. Vectors are used to represent the meaning and context of unstructured data, such as text and images, transforming it into a numeric representation. Vector search engines use distances in a vector space to represent similarity—similar content can be found by computing distances between vectors. In a vector search, finding related data for a search query amounts to searching for nearest neighbors of an embedding, i.e., vector representation, of a query object in the relevant embedding space.

A user input, such as a search query, to a search engine may include only a few words. In the context of vector search, this may result in poor search performance due to the low number of features which may be encoded in an embedding of the query object. More particularly, in a high-dimensional embedding space, a short text input consisting of few words is unable to give useful shape in all dimensions to enable an accurate vector search. A high-dimensional embedding space allows for search that can retrieve highly relevant and contextually similar results. It is desirable to compose representations of query objects that can exploit the benefits of searching high-dimensional data.

The present application discloses techniques for performing vector search that leverage use of a large language model (LLM). User input of a search query (or text input to a chatbot, etc.) is processed by an LLM. The user input may, for example, be a search query having a length (or word count, etc.) that is less than a defined threshold maximum. The LLM processes the user input and generates data that complements and/or enhances the user input.

For example, the generated enhancement data may include the search query and/or additional keywords or synonyms. Additionally, or alternatively, the generated enhancement data may be in a format associated with the embedding space. For example, if the embedding space is a sentence embedding space, the generated enhancement data may include full sentences based on the search query. Additionally, or alternatively, the generated enhancement data may be based on a desired level of specificity or generalization for a search of the embedding space. The generated enhancement data may comprise text that results in a vector embedding having particular properties. By way of example, for a product (e.g., cowboy hat) search, the enhancement data may be such that the vector embedding is spatially equidistant to numerous types of "hats" (i.e., more general), rather than, for example, spatially closer to a single color of cowboy hat (i.e., more specific). The original user input, the text generated by the LLM, or a combination thereof may be transformed into a vector embedding to be used in search.

In some implementations, the LLM may be provided additional context for generating the enhancement text. For example, when the user input comprises text input for a chatbot, the LLM may be provided with historical chat log data for the user. As another example, when the search is a product search (or similar search on an e-commerce platform), user profile information such as purchase history, browsing history, and the like, may be provided to the LLM along with user input of a search query. The LLM may then generate the input enhancement data based on the user input and relevant context, and a vector embedding may be created using the original user input and/or the input enhancement data.

The disclosed technique of enhancing user input using an LLM prior to a vector search may find application in various different contexts. In an example implementation, a chatbot application that is configured for performing various types of searches may use an LLM for enhancing user input to the chatbot. The chatbot may initially ask a user for text input (e.g., the user's product of interest). Upon receiving input of the user's initial response (e.g., "cowboy hat"), the chatbot may present follow-up questions for the user (e.g., when does the user want to wear the cowboy hat). The user may provide further responses to the questions (e.g., "in the summer'). The LLM may infer additional properties of a product that the user is searching for (e.g., lightweight, summer-suitable, etc.) based on the user's responses to the chatbot prompts. The additional properties are captured using vector embeddings and then used in a vector search. The vector search may identify products that are similar to, or otherwise related to, the user's desired product(s). The LLM may be trained on a plurality of different search spaces, including the vector space. In particular, the enhancement text may be generated based on text data that is available in multiple search spaces.

In one embodiment, the prompt to the LLM may instruct it to generate the type/style/structure of text that more closely resembles the text in the library or embedding space being searched. For example, the LLM may generate enhancement text in the style of a typical product description text. The generation of a product description text may first include one or more additional steps, such as the use of an LLM for the generation of additional properties (as per the paragraph above), and those additional properties may then be used as part of the prompt to the LLM to generate the product description text. This enhancement text that is in the structure and style of a product description may then be embedded for use in the vector search of a library of product descriptions.

While the above description refers primarily to text searches, it will be understood that the disclosed techniques may be suitable for various different types of searches. For example, visual search (i.e., search based on visual features in images, video, etc.) may be similarly enhanced based on generating “enhancement” visual representations and transforming the enhancement representations into vector embeddings prior to performing a vector search.

To better illustrate additional details regarding the methods and systems of the present application, some concepts relevant to generative AI models, neural networks, and machine learning (ML) are first discussed.

Generally, a neural network comprises a number of computation units (sometimes referred to as “neurons”). Each neuron receives an input value and applies a function to the input to generate an output value. The function typically includes a parameter (also referred to as a “weight”) whose value is learned through the process of training. A plurality of neurons may be organized into a neural network layer (or simply “layer”) and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term “ML-based model” or more simply “ML model” may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train an ML model that is intended to classify images, the training dataset may be a collection of images. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

Figure 6:
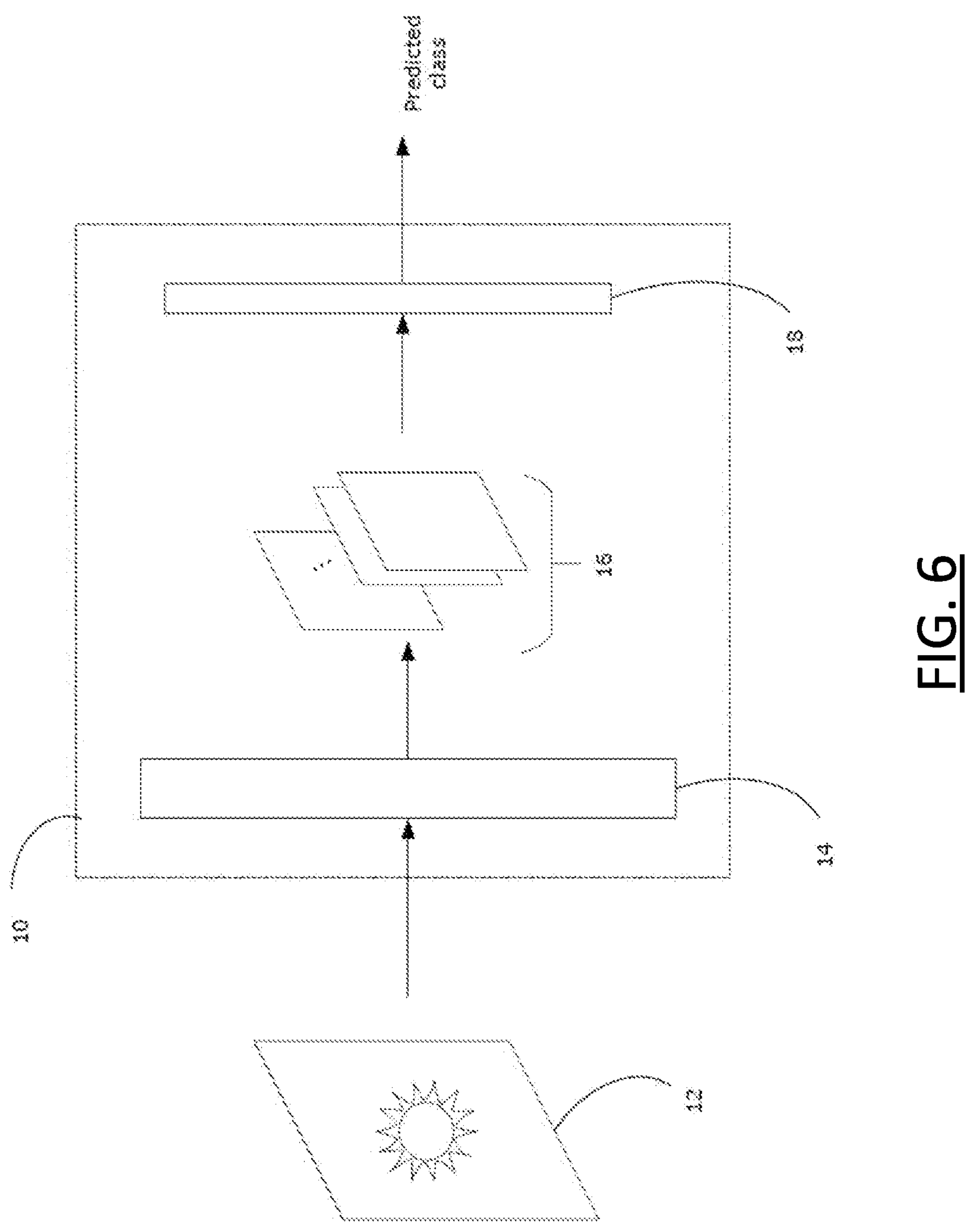
FIG. 6 is a block diagram of a simplified convolutional neural network, which may be used in examples of the present disclosure.

FIG. 6 is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to an ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 7:
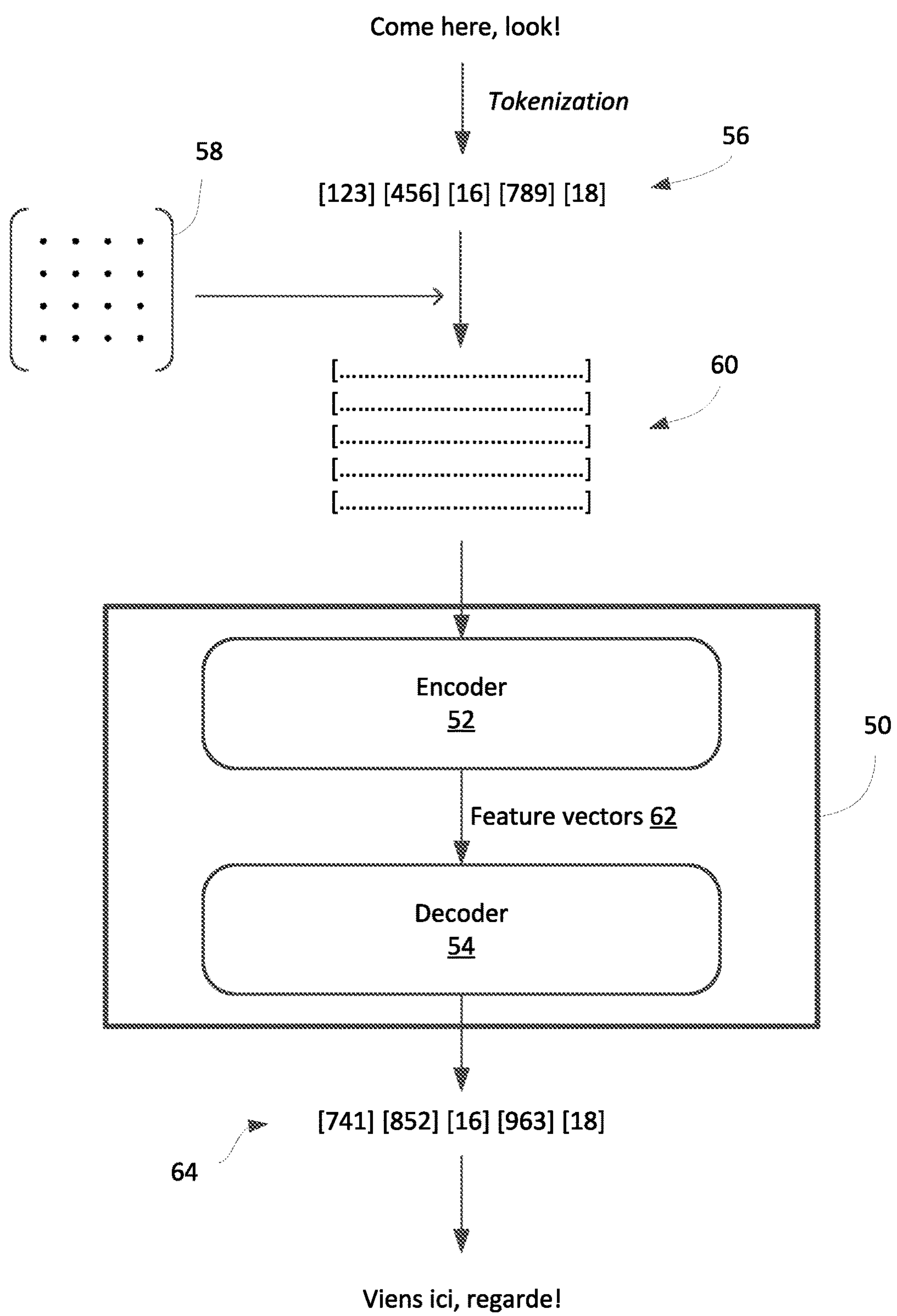
FIG. 7 is a block diagram of a simplified transformer neural network, which may be used in examples of the present disclosure.

FIG. 7 is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 7, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 9 for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally, or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally, or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 5:
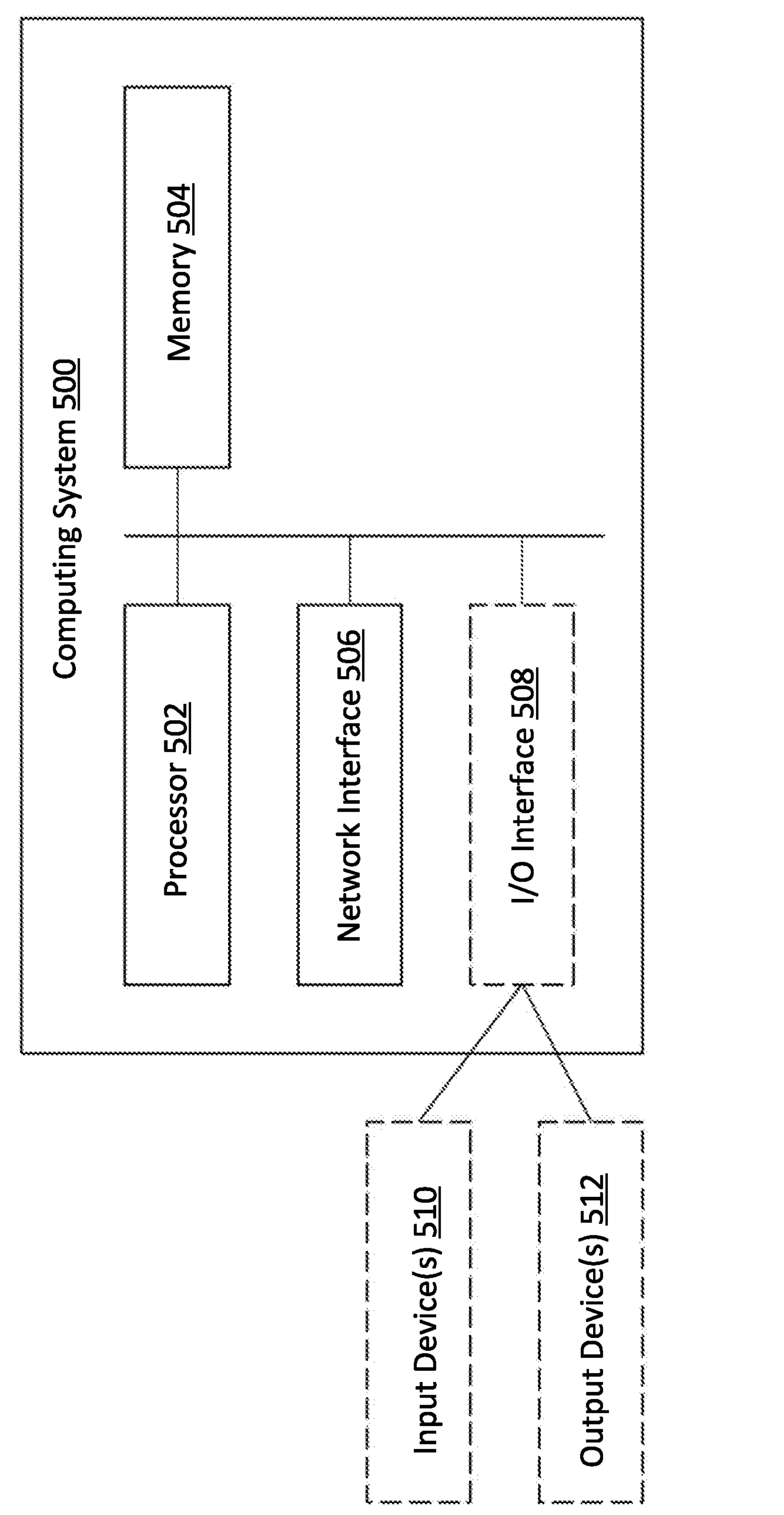
FIG. 5 is a block diagram of an example computing system, which may be used to implement examples of the present disclosure.

FIG. 5 illustrates an example computing system 500, which may be used to implement examples of the present disclosure, such as a prompt generation engine to generate prompts to be provided as input to a language model such as an LLM. Additionally, or alternatively, one or more instances of the example computing system 500 may be employed to execute the LLM. For example, a plurality of instances of the example computing system 500 may cooperate to provide output using an LLM in manners as discussed above.

The example computing system 500 includes at least one processing unit, such as a processor 502, and at least one physical memory 504. The processor 502 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 504 may include a volatile or non-volatile memory (e.g., a flash memory, a random-access memory (RAM), and/or a read-only memory (ROM)). The memory 504 may store instructions for execution by the processor 502, to the computing system 500 to carry out examples of the methods, functionalities, systems and modules disclosed herein.

The computing system 500 may also include at least one network interface 506 for wired and/or wireless communications with an external system and/or network (e.g., an intranet, the Internet, a P2P network, a WAN and/or a LAN). A network interface may enable the computing system 500 to carry out communications (e.g., wireless communications) with systems external to the computing system 500, such as a language model residing on a remote system.

The computing system 500 may optionally include at least one input/output (I/O) interface 508, which may interface with optional input device(s) 510 and/or optional output device(s) 512. Input device(s) 510 may include, for example, buttons, a microphone, a touchscreen, a keyboard, etc. Output device(s) 512 may include, for example, a display, a speaker, etc. In this example, optional input device(s) 510 and optional output device(s) 512 are shown external to the computing system 500. In other examples, one or more of the input device(s) 510 and/or output device(s) 512 may be an internal component of the computing system 500.

A computing system, such as the computing system 500 of FIG. 5, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Reference is made to FIG. 1, which illustrates, in block diagram form, an example system 100. The system 100 may be implemented using one or more computing devices.

The system 100 includes a generative AI model 112, a search engine 114, and an embeddings module 116. The generative AI model 112 is an unsupervised or semi-supervised machine learning algorithm that has been trained using a set of training data content. The generative AI model 112 may be a transformer 50 (FIG. 7), as described above. The generative AI model 112 is configured to take an input prompt, and produces an output related to the input prompt. In some implementations, the generative AI model 112 may be a generative adversarial network. In some implementations, the generative AI model 112 may be a transformer-based model.

The input prompt may be a user-supplied prompt that is received from a user device 120 via a network 150. In the context of a search, the input prompt may be or include a user-supplied search query. The search query may be a query that a user enters into a search interface to find specific content. For example, the search query may include search terms inputted by a user to initiate a search of a database, such as a document library, product information database, and the like. The search query may comprise text, images, audio, and/or other forms of unstructured data.

In some implementations, the user-supplied query may be processed by the system 100 to generate a suitable prompt for inputting to the generative AI model 112. In particular, a user-supplied query may be modified to produce the input prompt. For example, an input prompt may be generated by adjusting a user-supplied query in accordance with one or more defined constraints associated with the generative AI model 112. The constraints may, for example, relate to restrictions (e.g., character limits, content filters, etc.) on acceptable prompts for the generative AI model 112.

In some implementations, the generative AI model 112 may be accessed via a user interface, such as a chatbot (e.g., ChatGPT), which facilitates text-based conversation. The generative AI model 112 may provide chat-like outputs responsive to user-inputted prompts. For example, upon receiving input of an initial prompt from a user, the generative AI model 112 may generate one or more follow-up questions, formatted as chat-outputs, to present to the user. The user can provide responses to the questions as chat-inputs to the generative AI model 112. In this way, information may be exchanged between the user and the generative AI model 112 in a dialogue format.

The search engine 114 receives the output produced by the generative AI model 112. The generative AI model 112 may thus be used to effectively process a user-inputted search query and provide relevant query data, i.e., output of the model, to the search engine 114. The search engine 114 may then perform a search of the relevant search space using the query data. The search may be a keyword search, a vector similarity search, or a hybrid search. The search space may comprise, for example, private or public repositories of data, document libraries, etc. or an embedding space corresponding to such data sources. The search engine 114 implements a suitable search algorithm which may depend, at least in part, on the type of requested search, the relevant search space, and/or the query data.

In at least some implementations, the search engine 114 is configured to perform vector searches. As previously described, a vector search uses vector embeddings for representing and searching content. The search engine 114 indexes queries and searchable objects (e.g., text, image, documents, data records, etc.) of a library with vector embeddings. In particular, the query set and searchable objects are each mapped to a vector in a common embedding space. An embeddings module 116 creates the vector representations of data. Embeddings are computed using machine learning models. The embeddings module 116 is configured to implement one or more embedding models for processing different types of data. Examples of pre-trained embedding models which may be implemented include: Word2Vec, Doc2Vec, Universal Sentence Encoder, Global Vectors (GloVe), Embeddings from Language Models (ELMo), FastText, MobileNet v2, SentenceBERT, InferSent, etc.

The search engine 114 computes similarity between vectors in the embedding space. In particular, the search engine 114 may use one or more metrics for calculating vector similarity such as, but not limited to, L2 (Euclidean) distance, cosine similarity, and inner product (dot product). Various algorithms for vector similarity search may be implemented by the search engine. Examples include k-nearest neighbor (kNN), approximate nearest neighbors (ANN) search, space partition tree and graph (SPTAG), Faiss, and hierarchical navigable small world (HNSW).

The system 100 may be configured to send the output over the network 150 to the user device 120. In particular, search results for a user-inputted query that are output by the search engine 114 may be transmitted to the user device 120 via the network 150. For example, the search results may be provided to the user device 120 for displaying on a user interface thereon in connection with a user-initiated search.

The network 150 is a computer network. In some implementations, the network 150 may be an internetwork such as may be formed of one or more interconnected computer networks. For example, the network 150 may be or may include an Ethernet network, an asynchronous transfer mode (ATM) network, a wireless network, or the like.

In some example implementations, the search engine 114 may be integrated as a component of an e-commerce platform. That is, an e-commerce platform may be configured to implement example embodiments of the search engine 114. In particular, the subject matter of the present application, including example methods for performing search of an embedding space, may be employed in the specific context of e-commerce. For example, the search engine 114 may be adapted to facilitate search of product information databases associated with an e-commerce platform.

Figure 2:
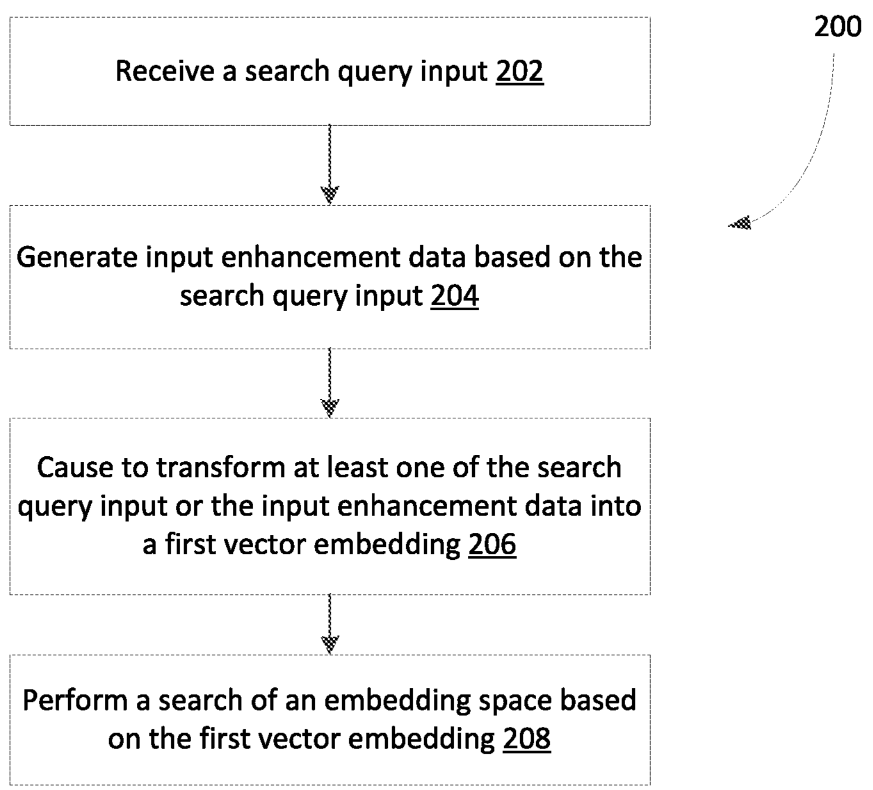
FIG. 2 shows, in flowchart form, an example method for performing a search of an embedding space.

Reference is now made to FIG. 2, which shows, in flowchart form, an example method 200 for performing a search of an embedding space. The method 200 may be implemented, at least in part, on a computing system, such as the system 100 of FIG. 1.

The method 200 may include training a generative AI model, namely a large language model (LLM), using a training data set. In some implementations, the LLM may be trained, or fine-tuned, using domain-specific training data. For example, in the e-commerce context, the LLM may be fed data comprising product information (such as product category, attributes, description, and the like), customer queries and corresponding responses (e.g., search results), etc.

After the LLM is trained and deployed, the computing system receives a search query input, in operation 202. The search query may comprise unstructured data. In particular, the search query may include at least one of text, image, video, audio, etc. In some implementations, the LLM may be deployed online in a network environment, and a web interface may be provided for the submission of search queries and for the display of corresponding results. A web page or mobile app, accessible on a computing device, may provide the interface. The input options for the search query may include a structured input, such as a web form or other mechanism for guiding a user to input or select data in a structured manner. The input option for the search query may be a free form text box enabling the user to provide any text input. Additionally, or alternatively, the input option may permit the input of non-text prompts, including image data, voice data, video data, or other multimedia. The search query may be received by the computing system from a user device, such as a mobile device or other computing device, connected to a computer network for accessing and interacting with the computing system.

The computing system generates input enhancement data based on the search query input, in operation 204. More particularly, the computing system processes the search query input using a large language model (LLM). The computing system may generate a suitable prompt for sending to the LLM. The prompt may include, for example, the search query, instructions for generating data for enhancing the search query, and other inputs (e.g., contextual data, randomized input, etc.). The computing system may provide the search query, as-is, to the LLM, or perform certain actions for pre-processing the search query prior to feeding to the LLM. For example, the computing system may generate a prompt to the LLM by adjusting the user-supplied search query in accordance with one or more defined constraints associated with the LLM. The constraints may, for example, relate to restrictions (e.g., character limits, content filters, etc.) on acceptable prompts for the LLM. The computing system may provide, to the LLM, instructions (in the form of input prompts) to generate enhancement data, such as complementary or supplementary data, for the search query.

The LLM generates a result (or results) using the search query as an input. Additionally, the results may be generated based on a seed value or other randomized input, in some implementations. The results, i.e., output of the LLM, represent input enhancement data for the search query. The input enhancement data comprises data that can complement, supplement, or supplant the search query in a (vector) search of the relevant search space. The input enhancement data may comprise at least one of enhancement text, image, video, or audio that is not included in the search query input.

In some implementations, the search query may be provided as input to the LLM only if the computing system determines that the search query does not satisfy certain defined criteria. For various types of searches, it is desirable to process the search queries in order to obtain query data associated with the queries that is conducive to accurate and/or efficient search. By way of example, a vector search of a high-dimensional embedding space may benefit from query embeddings that encode a large, or sufficient, number of features. A sparse query embedding may yield poor results in a search of high-dimensional data.

To ensure that a query embedding allows for an effective vector search, the computing system may be configured to compare the search query against defined criteria. For example, the word count (or query length) of the search query may be compared to a defined threshold value, such as a threshold minimum count/length, to determine whether the search query has a sufficient number of words (or is of sufficient length). The search query may be determined to be sufficient for a vector search if the word count/query length exceeds the defined threshold(s). In particular, the computing system may determine that input enhancement data is not required for the search query, and thus may not prompt an LLM to generate such enhancement data.

As another example, the number of different topics or attributes that are captured in the search query may be compared with one or more defined counts. The search query may be provided as an input to the LLM in response to the computing system determining that the counts associated with the search query do not exceed the relevant threshold values. In particular, in some implementations, only if the search query is determined to be insufficient to give useful shape in the relevant search space to enable an accurate vector search, the computing system may instruct the LLM to generate enhancement data for the search query.

The output of the LLM, i.e., input enhancement data, is passed to a search engine associated with the computing system. In operation 206, the computing system causes to transform the search query and/or the input enhancement data into a first vector embedding. The first vector embedding represents an embedding of query data (i.e., the search query input itself and/or corresponding input enhancement data) associated with the search query. An embeddings engine, such as the embeddings module 116 of FIG. 1, may be adapted to create the first vector embedding based on one or both of the search query and the input enhancement data. In at least some implementations, the search query input and the input enhancement data may be combined prior to creating the first vector embedding. That is, the first vector embedding may be created based on a combination of the search query and the input enhancement data. Alternatively, either the search query or the input enhancement data (but not both) may be embedded to create the first vector embedding.

In operation 208, the computing system performs a search of an embedding space based on the first vector embedding. In particular, a vector search of the embedding space may be initiated using the first vector embedding (i.e., query embedding). A search engine associated with the computing system receives, as input, the first vector embedding. The embedding space comprises vector embeddings associated with the space of all searchable objects for the search. The searchable objects, such as text, images, audio, documents, media objects, products, user records, or other data items, and combinations thereof, may each be mapped to a respective embedding vector. By way of example, products of a product library may be embedded based on embeddings of text in the production description, embeddings of product images, or both. The query set and the searchable objects are embedded in a common embedding space, allowing for a similarity search based on the query data.

In some implementations, the computing system may perform a search of a second embedding space based on a second vector embedding. The second vector embedding may be based on at least one of the search query input or the input enhancement data. For example, the search embedding space may comprise word embeddings of the query set and searchable objects and the second embedding space may comprise sentence embeddings of the query set and searchable objects. The results of searching the different embedding spaces may then be combined to produce the search results for the user-inputted search query.

The computing system may further cause to be presented, via the user device, one or more prompts comprising questions relating to the search query input. The prompts may be generated, for example, by the LLM and passed to the computing system. For example, the prompts may include follow-up questions generated by the LLM responsive to the user-inputted search query. The computing system may receive user responses to the one or more prompts, and the input enhancement data may be generated using the LLM based on the user responses. In particular, the user responses to the prompts may be provided as input (in addition to the user-supplied initial search query) to the LLM. Alternatively, for purposes of generating the input enhancement data, the user responses may bypass the LLM altogether and get reduced to a bag-of-words, e.g., for adding to the bag-of-words associated with the search query input.

Figure 3:
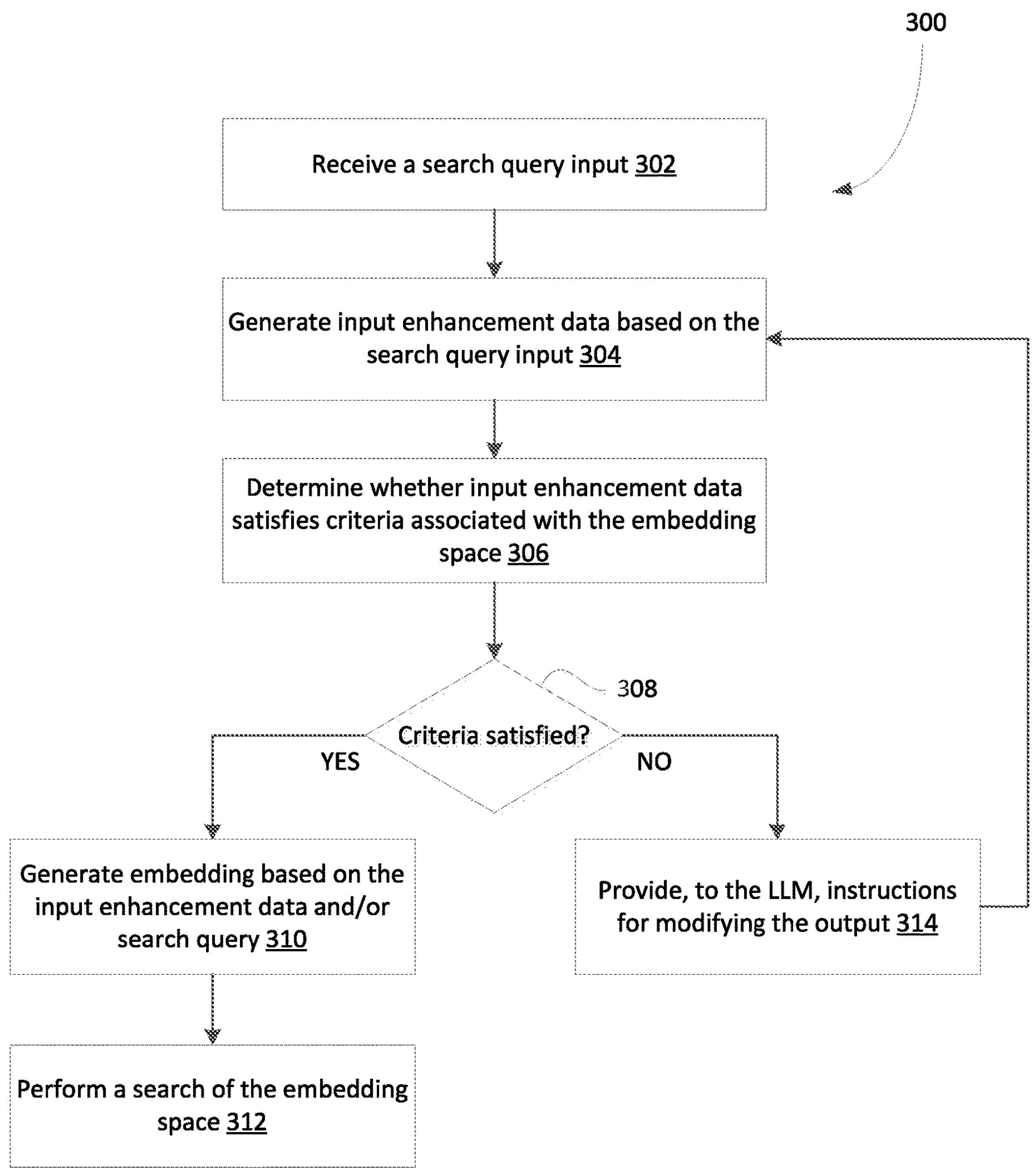
FIG. 3 shows, in flowchart form, another example method for performing a search of an embedding space.

Reference is now made to FIG. 3, which shows, in flowchart form, another example method 300 for performing a search of an embedding space. The method 300 may be implemented, at least in part, on a computing system, such as the system 100 of FIG. 1. The operations of method 300 may be performed in addition to, or as alternatives of, one or more operations of method 200.

The computing system receives a search query input, in operation 302. The search query may, for example, be inputted by a user via a search interface, such as may be accessed in a web or mobile application. For example, the search query may be received as a chat-input on a chatbot application on a user device. The user-inputted search query may comprise text, images, audio, etc., or a combination thereof.

In operation 304, the computing system generates input enhancement data based on the search query input using an LLM. More particularly, the search query is passed to an LLM as an input. The computing system sends a prompt to the LLM for instructing the LLM to generate input enhancement data for the search query. The prompt may include the search query, instructions to generate the input enhancement data, and other inputs (e.g., contextual data). In some implementations, the prompt may indicate, for example, a desired format, type, style, and/or structure for the input enhancement data that is output by the LLM.

An output of the LLM includes enhancement data for the search query. The input enhancement data may comprise text (e.g., keywords, synonyms, sentences, etc.), images, etc., that are related to the search query and/or other user-inputted data.

In the e-commerce context, a search query may comprise a phrase or keyword combination that is used for a product search of products that are sold on an e-commerce platform. That is, a search of products on an e-commerce platform may be performed using the search query. The input enhancement data may include, for example, product description text associated with the search query. For example, the input enhancement data may include text describing one or more products that are identified in the search query. The computing system may instruct the LLM to determine properties that are relevant to product(s) that is searched for, and said properties may be used as part of a prompt to the LLM to generate text describing said product(s). In some implementations, properties relevant to the search query may be determined using the LLM.

The computing system may obtain additional query-related information which may be passed (e.g., in a prompt) to the LLM for generating input enhancement data. In some implementations, the computing system may receive, via a search interface (e.g., a chatbot application), user responses to questions relating to the search query. For example, in a product search, the questions may relate to properties of a product that is identified in the search query. The search query may comprise a phrase (e.g., "cowboy hat") that identifies a product type, and the computing system may present, in chatbot conversation format, questions intended to solicit more details regarding the product that is searched for. For example, the chatbot application may present questions for soliciting when or where the product will, or is desired to, be used, worn, etc.

The computing system determines whether the generated input enhancement data satisfies defined enhancement criteria associated with the embedding space (operation 306). Before embedding the input enhancement data, it may be useful to determine the suitability of the output of the LLM for embedding. If the generated enhancement data is not appropriate for the embedding space and/or the vector search, the computing system may instruct the LLM to re-generate the input enhancement data (e.g., by providing a modified prompt). The computing system may, for example, process the input enhancement data and perform a check to determine whether it is correct, adequate in form and content, has the right length, etc.

In some implementations, the computing system may determine whether the input enhancement data is in a proper format for the embedding space. For example, if the embedding space is a sentence embedding space, the computing system determines whether the output of the LLM comprises full or partial sentences that are based on the search query. The computing system may determine properties of the embedding space, such as distance metric, data format, etc., and the enhancement criteria may be defined based on said properties. In particular, the computing system may be configured to verify whether the input enhancement data generated by the LLM is consistent or compatible with the properties of the embedding space.

In some implementations, the enhancement criteria may relate to specificity of the input enhancement data. For example, the text generated by the LLM may be such that an embedding of the text to be used in a search is more general (e.g., spatially equidistant to embeddings of similar products) rather than specific (e.g., skewed to be spatially closer to a particular type of product). More generally, the computing system may be configured to first compute a vector representation of at least part of the input enhancement data and compare said vector representation to embeddings of sample searchable objects to determine suitability of the input enhancement data.

In some implementations, the enhancement criteria may relate to length, size, and/or dimensionality of the input enhancement data. The enhancement criteria may include, for example, defined threshold (e.g., minimum or maximum) values for size of text, images, etc. that may be embedded to the embedding space. The thresholds may be those values that are imposed when generating the search library embeddings. As a further example, the computing system may compare a number of features that are encoded in an embedding of the input enhancement data with relevant threshold values. A minimum dimensionality requirement for the embedding of the enhancement data may stipulate that the number of encoded features exceeds a defined threshold.

If the computing system determines that the enhancement criteria are satisfied (operation 308), the computing system generates an embedding based on the input enhancement data and/or the search query input. If, on the other hand, the enhancement criteria are determined to be not satisfied, the computing system provides, to the LLM, instructions for modifying the output, in operation 314.

The method then proceeds back to operation 304, and new input enhancement data is generated based on the search query input using the LLM. In particular, the computing system may provide instructions, in the form of a modified prompt, to the LLM for generating alternate enhancement data for the search query. In some implementations, the instructions to the LLM may include an indication of one or more deficiencies of the previous input enhancement data. For example, the modified prompt may specify enhancement criteria which were not satisfied by the previous input enhancement data and include instructions for remedying the identified deficiencies.

Figure 4:
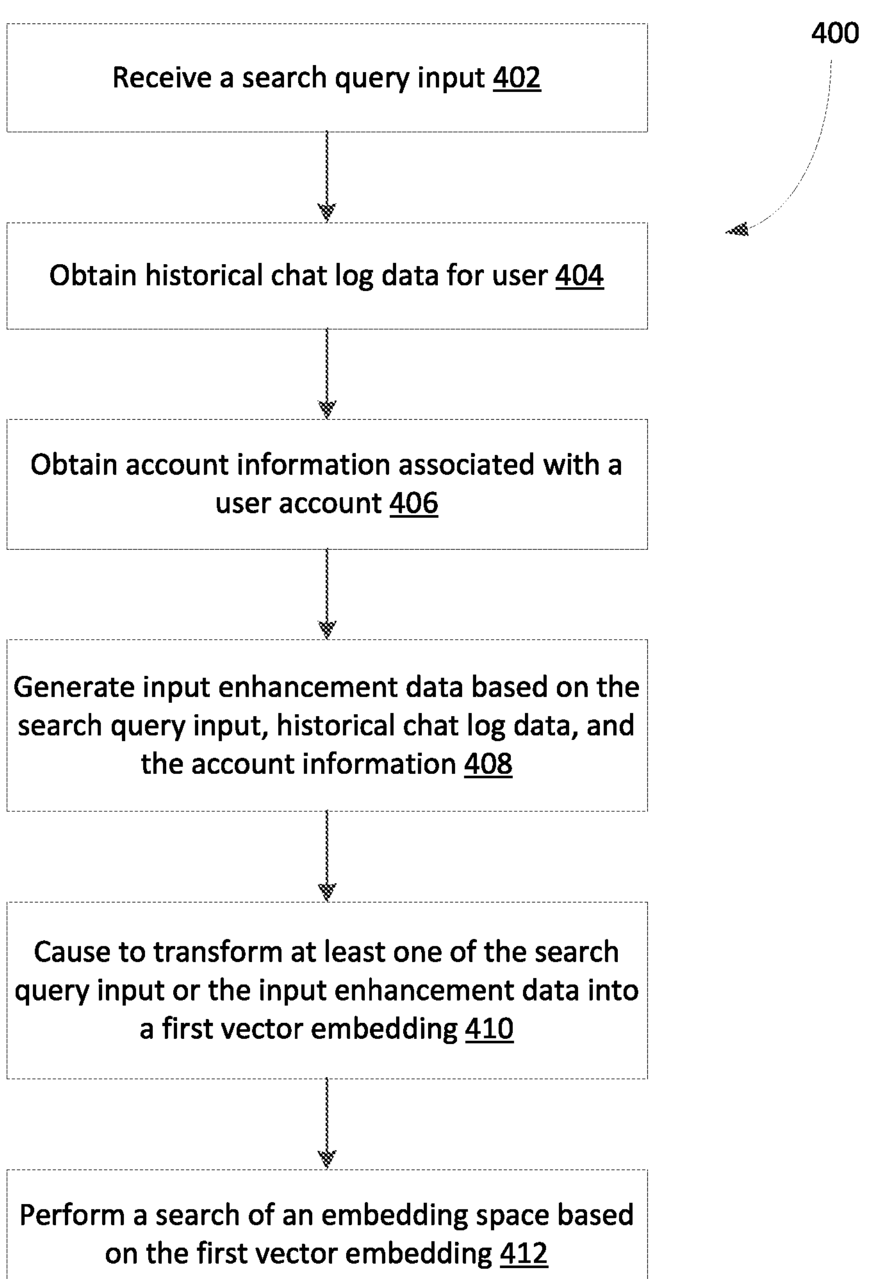
FIG. 4 shows, in flowchart form, another example method for performing a search of an embedding space.

Reference is now made to FIG. 4, which shows, in flowchart form, another example method 400 for performing a search of an embedding space. The method 400 may be implemented, at least in part, on a computing system, such as the system 100 of FIG. 1. The operations of method 400 may be performed in addition to, or as alternatives of, one or more of the operations of methods 200 and 300.

In operation 402, the computing system receives a search query input. A user inputs the search query, for example, via a search interface such as a text input form or a chatbot application. The computing system also obtains contextual data associated with the search query. Contextual data refers to data that is different from the search query and that captures information about the user that may be relevant for the search. The search query may be processed using the LLM by inputting the contextual data to the LLM prior to generating the input enhancement data. That is, the LLM may be provided with both the search query and contextual data as input.

The contextual data may, in some implementations, include historical chat log data for a user. For example, the chat log data may comprise chat conversations between the user and a chatbot application that the user previously interacted with. The computing system may obtain the historical chat log data, in operation 404. The historical chat log data may be stored in memory in association with a particular user, computing device, chat session, etc.

In some implementations, the contextual data may include account information of a user account. In the e-commerce context, account information may include information associated with a user account on an e-commerce platform. The account information may include, for example, product preference data (e.g., wish lists, shopping carts, etc.), purchase history data, browsing history data, and the like, that is associated with a user account on an e-commerce platform.

Additionally, or alternatively, the account information may include user-specific profile data such as nationality, citizenship, sizing parameters, brand/product preferences, or associated buyer cohort characteristics (e.g., age group, gender, spending habits, hobbies, etc.). The computing system may obtain account information associated with the user account, in operation 406. The account information may be stored, for example, in a database associated with an e-commerce platform or computing system.

The computing system may then generate input enhancement data using an LLM, based on the search query and the contextual data which may include historical chat log data and/or the account information (operation 408). By way of example, a search query inputted by a user in a product search may comprise a phrase (e.g., “white shoes”). The search query may be provided, in an input prompt, to an LLM along with contextual data. The contextual data may include, for example, the user’s purchase history data, including previously purchased product information. The input enhancement data generated by the LLM may include descriptive text about products searched for by the user (e.g., “trendy and stylish white shoes”).

As a further example, profile information and product preference data may be supplied to the LLM with instructions to generate input enhancement data for the search query. In particular, a prompt to the LLM may include a user’s search query, instructions to generate enhancement data, profile information associated with the user, and the user’s product preference data. The output of the LLM may specify additional details for products searched for by the user (e.g., “trendy and stylish white shoes, perfect for a 35-year-old white male who likes shoes from Nike, Hoka, and OnCloud”).

In operation 410, the computing system causes to transform the search query and/or the input enhancement data into a first vector embedding. In operation 412, the computing system performs a search of an embedding space using the first vector embedding. The operations 410 and 412 may be performed in a similar manner as those described with respect to methods 200 and 300.

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some implementations, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:

receiving a search query for a search of items in a database;

generating an enhanced query based on the search query, the generating including:

identifying, based on text of the search query, a first object and one or more properties of the first object;

providing, to a large language model (LLM), an indication of the first object and instructions to produce output comprising description text that includes inferred additional properties of the first object; and combining the search query text and the output of the LLM to obtain text of the enhanced query;

obtaining a first vector embedding based on the enhanced query text; and performing a search of an embedding space associated with the database based on the first vector embedding.

2. The method of claim 1, wherein the search query comprises at least one of text, image, or video.

3. The method of claim 1, further comprising providing, to the LLM, instructions to output at least one of enhancement text, enhancement image, or enhancement video that is not included in the search query.

4. The method of claim 1, further comprising:

causing to be presented, via a user device, one or more prompts including questions relating to the search query;

receiving user responses to the one or more prompts; and providing, to the LLM, the user responses to the one or more prompts.

5. The method of claim 4, wherein the one or more prompts comprise questions relating to properties of a product identified in the search query and wherein the user responses are received via a chatbot interface.

6. The method of claim 1, wherein performing the search further comprises:

performing a search of a second embedding space based on a second vector embedding, the second vector embedding based on at least one of the search query or the description text; and combining one or more results of the search of the embedding space with the search of the second embedding space.

7. The method of claim 1, further comprising:

obtaining contextual data associated with the search query, wherein generating the enhanced query includes providing, to the LLM, the contextual data associated with the search query.

8. The method of claim 7, wherein the contextual data comprises historical chat log data for a user.

9. The method of claim 7, wherein the contextual data comprises profile information of a user, the profile information including at least one of product purchase history or browsing history.

10. The method of claim 1, further comprising:

determining that the search query does not satisfy defined criteria in connection with the search of the embedding space, wherein the enhanced query is generated only in response to determining that the search query does not satisfy the defined criteria.

11. The method of claim 10, wherein the defined criteria relate to at least one of:

query length of the search query; or number of different attributes associated with the search query.

12. A computing system, comprising:

a processor; and a memory coupled to the processor, the memory storing computer-executable instructions that, when executed by the processor, configure the processor to:

receive a search query for a search of items in a database;

generate an enhanced query based on the search query, the generating including:

identifying, based on text of the search query, a first object and one or more properties of the first object;

providing, to a large language model (LLM), an indication of the first object and instructions to produce output comprising description text that includes inferred additional properties of the first object; and combining the search query text and the output of the LLM to obtain text of the enhanced query;

obtain a first vector embedding based on the enhanced query text; and perform a search of an embedding space associated with the database based on the first vector embedding.

13. The computing system of claim 12, wherein the instructions, when executed, further configure the processor to provide, to the LLM, instructions to output at least one of enhancement text, enhancement image, or enhancement video that is not included in the search query.

14. The computing system of claim 12, wherein the instructions, when executed, are to further cause the processor to:

cause to be presented, via a user device, one or more prompts comprising questions relating to the search query;

receive user responses to the one or more prompts; and provide, to the LLM, the user responses to the one or more prompts.

15. The computing system of claim 12, wherein performing the search further comprises:

performing a search of a second embedding space based on a second vector embedding, the second vector embedding based on at least one of the search query or the description text; and combining one or more results of the search of the embedding space with the search of the second embedding space.

16. The computing system of claim 12, wherein the instructions, when executed, are to further cause the processor to:

obtain contextual data associated with the search query, wherein generating the enhanced query includes providing, to the LLM, the contextual data associated with the search query.

17. The computing system of claim 16, wherein the contextual data comprises historical chat log data for a user.

18. The computing system of claim 16, wherein the contextual data comprises profile information of a user, the profile information including at least one of product purchase history or browsing history.

19. A non-transitory processor-readable medium storing processor-executable instructions that, when executed by a processor, are to cause the processor to:

receive a search query for a search of items in a database;

generate an enhanced query based on the search query, the generating including:

identifying, based on text of the search query, a first object and one or more properties of the first object;

providing, to a large language model (LLM), an indication of the first object and instructions to produce output comprising description text that includes inferred additional properties of the first object; and combining the search query text and the output of the LLM to obtain text of the enhanced query;

obtain a first vector embedding based on the enhanced query text; and perform a search of an embedding space associated with the database based on the first vector embedding.

* * * * *